(No Model.) 3 Sheets—Sheet 2.

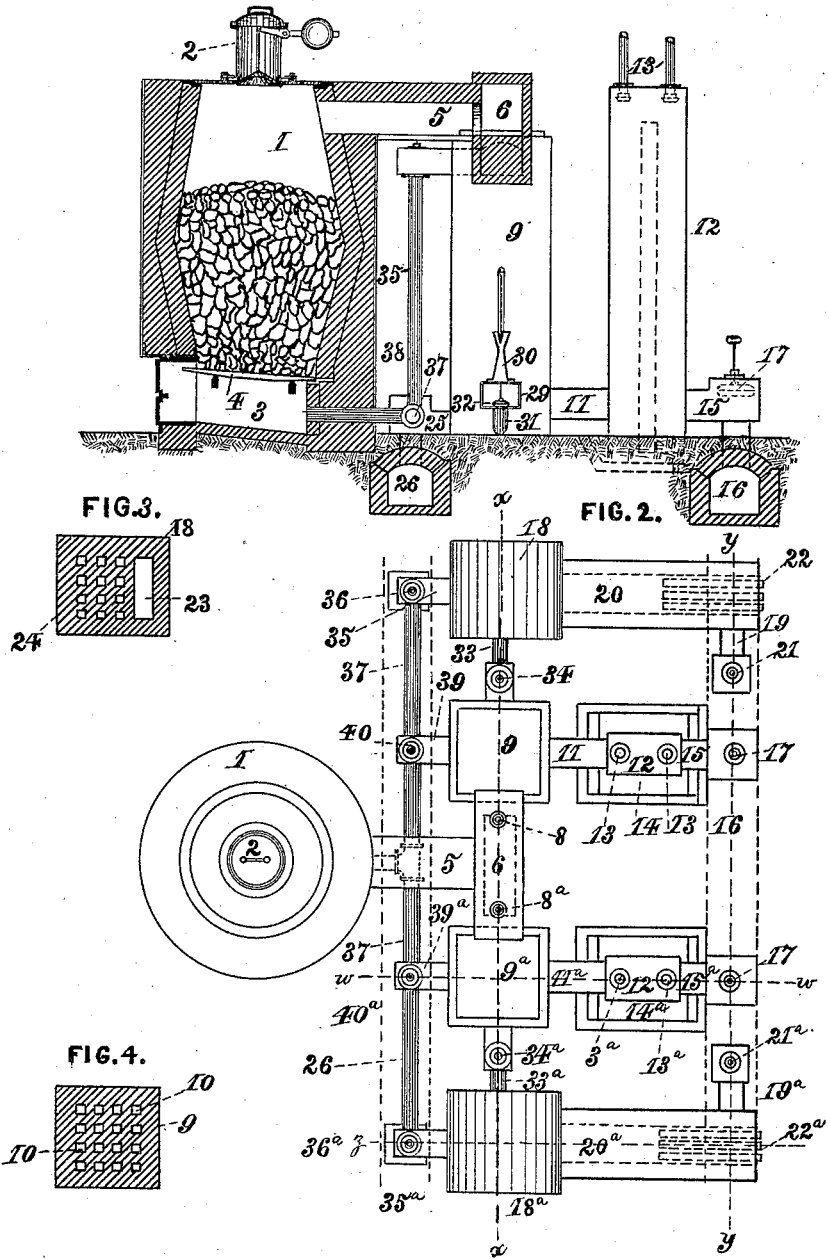

S. T. WELLMAN & G. W. GOETZ.
GAS PLANT.

No. 371,810. Patented Oct. 18, 1887.

WITNESSES
F. E. Gaither
M. S. Murphey

INVENTORS
Samuel T. Wellman
George W. Goetz
Darwin S. Wolcott  Attorney (No Model.) 3 Sheets—Sheet 3.

S. T. WELLMAN & G. W. GOETZ.
GAS PLANT.

No. 371,810. Patented Oct. 18, 1887.

WITNESSES
INVENTORS

UNITED STATES PATENT OFFICE.

SAMUEL T. WELLMAN AND GEORGE W. GOETZ, OF CLEVELAND, OHIO, ASSIGNORS TO THE FUEL GAS AND ELECTRIC ENGINEERING COMPANY, (LIMITED,) OF PITTSBURG, PENNSYLVANIA.

GAS-PLANT.

SPECIFICATION forming part of Letters Patent No. 371,810, dated October 18, 1887.

Application filed February 24, 1887. Serial No. 228,673. (No model.)

*To all whom it may concern:*

Be it known that we, SAMUEL T. WELLMAN and GEORGE W. GOETZ, residing at Cleveland, in the county of Cuyahoga and State of Ohio, citizens of the United States, have invented or discovered certain new and useful Improvements in Apparatus for the Manufacture of Gas, of which improvement the following is a specification.

Figure 5:
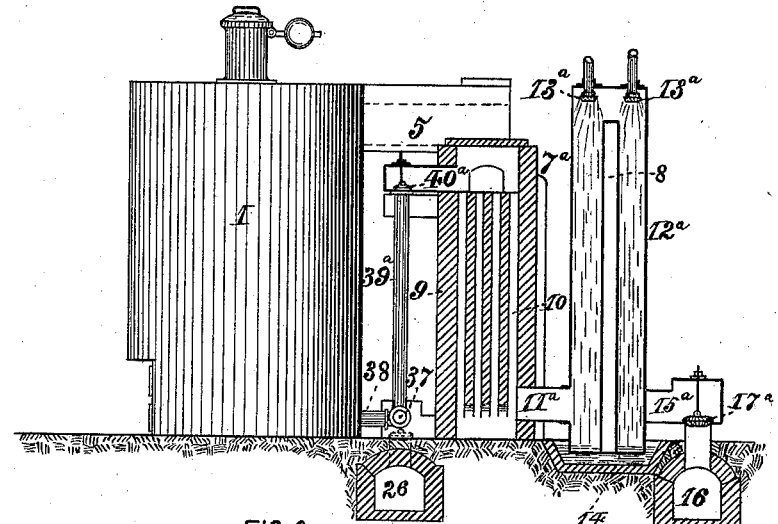
Figure 6:
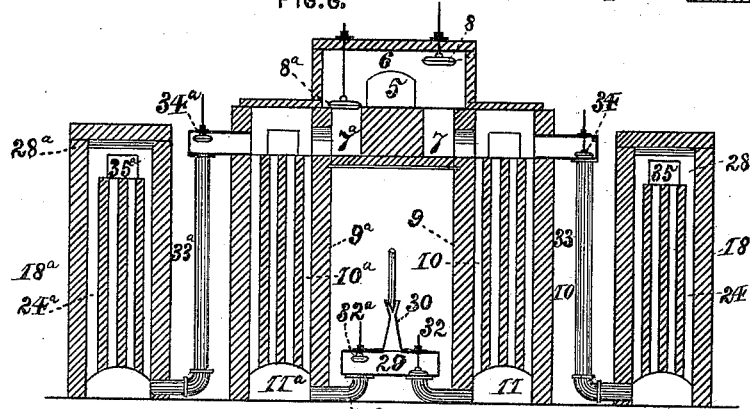
Figure 7:
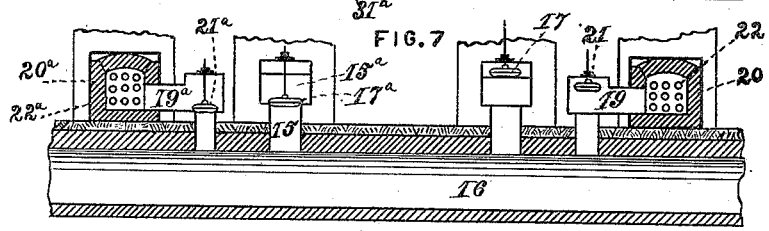
Figure 8:
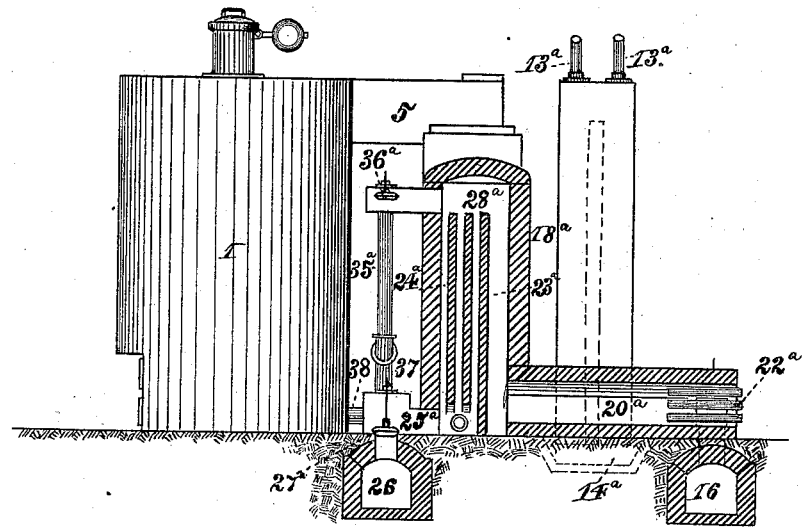
Figure 9:
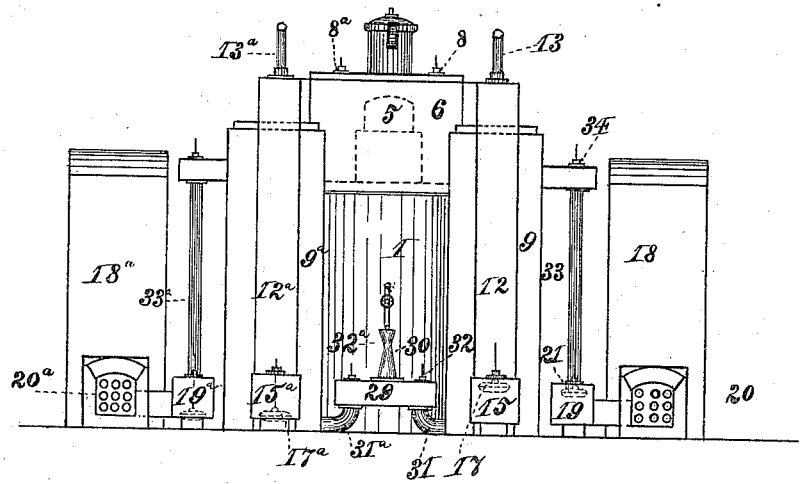

In the accompanying drawings, which make part of this specification, Figure 1 is a view, partly in section and partly in elevation, of our improved gas-plant. Fig. 2 is a top plan view of the same. Figs. 3 and 4 are transverse sectional views of the superheater and heater, respectively. Fig. 5 is a sectional elevation of one of the heaters and scrubbers, the section being taken on the line $w\ w$, Fig. 2. Fig. 6 is a sectional elevation taken on the line $x\ x$, Fig. 2. Fig. 7 is a sectional view of a conduit, taken on the line $y\ y$, Fig. 2. Fig. 8 is a sectional elevation of one of the superheaters and its connecting-flues, taken on the line $z\ z$, Fig. 2. Fig. 9 is a rear elevation of the plant.

The invention herein relates to certain improvements in plants for the manufacture of combined water and producer gas, and has for its object such a construction and arrangement of heaters, flues, and passages as not only will permit of the utilization of the heat of the gases as they escape from the producer in facilitating the operation and increasing the percentage of combustible gases produced, but also will allow of a still further enrichment of the gas in its combustible qualities and an increase of volume beyond that attainable in the ordinary construction of plant.

In general terms, the invention consists in the construction and combination of parts, all as more fully hereinafter described and claimed.

In the practice of our invention the producer or stack 1 is of the ordinary or any desirable form and construction, and is provided with a charging device, 2, an ash-pit, 3, and grate-bars 4, on which the coal is supported during the gas-making operations. The gas escapes from the producer by the flue 5, which is connected to a transverse flue, 6, midway of its length. The flue 6 communicates, by passages 7 and $7^a$, governed, respectively, by valves 8 and $8^a$, with two regenerators or heaters, 9 and $9^a$. Said heaters and their accessories are of similar construction, one to the other, and therefore one only need be described. The parts of one heater are designated by simple reference-figures, and the corresponding parts of the other by the same figures with the letter $a$ added. From the flue 6 the gas passes into one or the other of the heaters, as, for illustration, by the passage 7, (see Fig. 6,) which can be opened and closed by the valve 8, into the heater 9, said heater being preferably formed of fire-brick and having a number of small vertical passages, 10, therethrough, (see Fig. 4,) although any other suitable construction, whereby a large area of heating or regenerating surface is exposed to contact with the gas, may be used. The gas, which in passing through the heater imparts a large portion of its heat to the wall of the passages 10, escapes by the flue 11 into the scrubber 12. The scrubber 12 consists of an inverted-U-shaped tube or a shell having a transverse partition extending nearly to the top thereof, and is provided immediately above each leg or compartment with spraying-nozzles 13, connected by pipes to any suitable source of water-supply. The lower ends of the legs or compartments of the scrubber are immersed in water contained in the basin 14. The gas enters one leg or compartment of the scrubber at or near its lower end and, passing up said leg, encounters the spray from one of the nozzles. Then it passes down the other leg or compartment, being still subjected to the purifying action of the spray, and escapes by the flue 15 into the main conduit 16. The flue 15 is provided with a valve, 17, whereby the flow of gas therethrough may be regulated.

While the gas is passing from the producer to the conduit 16, as above described, and heating in its passage the walls of a heater, 9, the superheater 18, corresponding in its construction and connections with another superheater, $18^a$, is being highly heated by the combustion therein of gas drawn from the main conduit 16 through the flues 19 and 20, (see Figs. 7 and 8,) the former being provided with a regulating-valve, 21, and the latter with a series of small pipes or passages, 22, at its outer end, for the introduction of air thereinto in finely-divided quantities, whereby a more thorough mixture of gas and air is obtained. The superheater is provided on one side with the comparatively large passage 23, communicating at its lower end with the flue 20, and with a number of small passages, 24, communicating at their lower end with the flue 25, leading to the chimney-flue 26, and provided with a governing-valve, 27. The passages 23 and 24 open into a common chamber, 28, at the upper end of the heater. The flame and products of combustion flow from the flue 20 up through the passage 23, down the small passage 24, and through the flue 25 into the chimney-stack.

During the above-described operations steam and air are forced into the box or chest 29 by the injector 30, and pass thence through the pipe $31^a$, the valve $32^a$ being open, into the lower end of the heater $9^a$, which has been previously heated in the manner described in connection with the heater 9. The heaters 9 and $9^a$ being similar in construction, the steam and air will flow up through the passages $10^a$, where they are highly heated, and will pass from the upper end of the heater by the pipe $33^a$, the valve $34^a$ of said pipe being open and the valve $8^a$ of the flue $7^a$ being closed, into the lower end of the superheater $18^a$. This superheater $18^a$ having been highly heated by the previous combustion of gas therein in the manner described in connection with the superheater 18, the already highly-heated steam and air will be still further heated as it passes up through the passages $24^a$ into the chamber $18^a$. From the chamber $18^a$ the now thoroughly-superheated steam and air will pass by the pipe $35^a$, the valve $36^a$ therein being open, into the horizontal pipe 37, and thence by its branch 38 into the ash-pit 3, and thence up through the incandescent charge of the producer, where reduction to combustible gases is effected. Said gases escaping by the exit-flue 5, pass by the route already described to the main conduit 16.

When it is desired to reverse the operation of the apparatus, the heater $9^a$ and superheater $18^a$ having become cooled, the valves are closed as follows: 8 and 17, for the purpose of stopping the flow of gases from the producer to the conduit through the heater 9 and scrubber 12; 21 and 27, to prevent further combustion in the superheater 18, which has become sufficiently hot, and $32^a$, $34^a$, and $36^a$ to stop the flow of steam and air through the heater $9^a$ and superheater $18^a$. Simultaneously with the closing of the valves, as above stated, the following valves are opened: $8^a$ and $17^a$, to permit the gas from the producer to flow through the heater $9^a$ and scrubber $12^a$ to the conduit 16; $21^a$ and $27^a$, for the purpose of heating the superheater $18^a$, and 32, 34, and 36, for the purpose of allowing the steam and air to be forced through the heater 9 and superheater 18 to the ash-pit of the stack 1.

By the above-described arrangement of heaters and superheaters and their connections the steam can be heated almost to the point at which it is resolved to its elementary gases, and hence will reduce the temperature of the incandescent coal very slightly, if at all, any reduction of temperature effected by the steam being easily recovered by the action of the heated air carried in by the steam; hence the process of gas production may be carried on continuously, a minimum of air and a maximum of steam being employed, the result being the production of large volumes of gas containing a large percentage of combustible and a small percentage of incombustible gases.

As the superheaters are subjected to the highest heat, and will therefore require repair more frequently, provision is made for the continuation of the gas-producing process. The upper ends of the heaters 9 and $9^a$ are connected by pipes 39 and $39^a$ with the horizontal pipe 37, the pipes 39 and $39^a$ being provided with valves 40 and $40^a$, which are closed during the normal operation of the apparatus. When it is desired to use the heaters 9 and $9^a$ alone in the manner above referred to, the valves 34 and $34^a$ of the pipes 33 and $33^a$, connecting the heater with the superheater, are closed, and the valves 40 and $40^a$, being alternately opened and closed, the gas from the producer passes into and through one or the other of the heaters 9 or $9^a$, and thence through the scrubber into the conduit 16. When the heater has been raised to a sufficient temperature by the escaping gas, its valve 8 or $8^a$, as the case may be, is closed, and the corresponding valve of the other heater is opened for the passage of gas through the latter. The valve 40 or $40^a$ of the heater through which the gas has been passed and the valve 32 or $32^a$, leading from the chest 29 to said heater, are then opened, and the corresponding valves of the other heater are closed, upon which the current of steam and air passes through the heater through which the gas has been passed, and after having acquired a considerable elevation of temperature therefrom passes by the pipes 39 or $39^a$, (as the case may be,) 35, 37, and 38 to the ash-pit of the producer.

After the heater has been cooled to such degree by the passage of the air and steam as to require reheating the valves are reversed and the current of steam and air passed through the opposite heater.

A producer, in combination with one or more heaters, an injector for forcing air and steam through the heaters, and regulating-valves governing the traverse of the air and steam, is set forth in an application filed by us of even date herewith, Serial No. 228,672, and is not claimed as of our present invention.

We claim herein as our invention—

1. In a gas-plant, the combination of a producer or stack having valved exit-flues, regenerators or heaters provided with a series of passages or regenerative channels exposed to the gas in its traverse therethrough, and having valved connections at their upper and lower ends, respectively, with the exit-flues and the ash-pit of the producer and with a common conduit, a scrubber interposed between the conduit and heaters, and an injector for forcing steam and air through the heaters, substantially as set forth.

2. In a gas-plant, the combination of a producer or stack having exit-flues, heaters having valved connections with said exit-flues and with a common conduit, superheaters having valved connections with the heaters and the ash-pit of the producer, and an injector for forcing steam and air through the heaters and superheaters into the ash-pit of the producer, substantially as set forth.

3. In a gas-plant, the combination of a producer or stack having exit-flues, heaters having valved connections with said exit-flues and with a common conduit, whereby the interior of the heaters is exposed to contact with the gas as it passes to the conduit, superheaters having valved connections with the heaters and the ash-pit of the producer, a flue connecting the superheater with the conduit and open air for the purpose of heating the superheaters by combustion of gas therein, and an injector for forcing steam and air through the heaters and superheaters into the ash-pit of the producer, substantially as set forth.

In testimony whereof we have hereunto set our hands.

SAMUEL T. WELLMAN.
GEORGE W. GOETZ.

Witnesses:
THOS. H. BROOKS,
W. H. SHEPARD.